United States Patent Office 2,992,567
Patented July 18, 1961

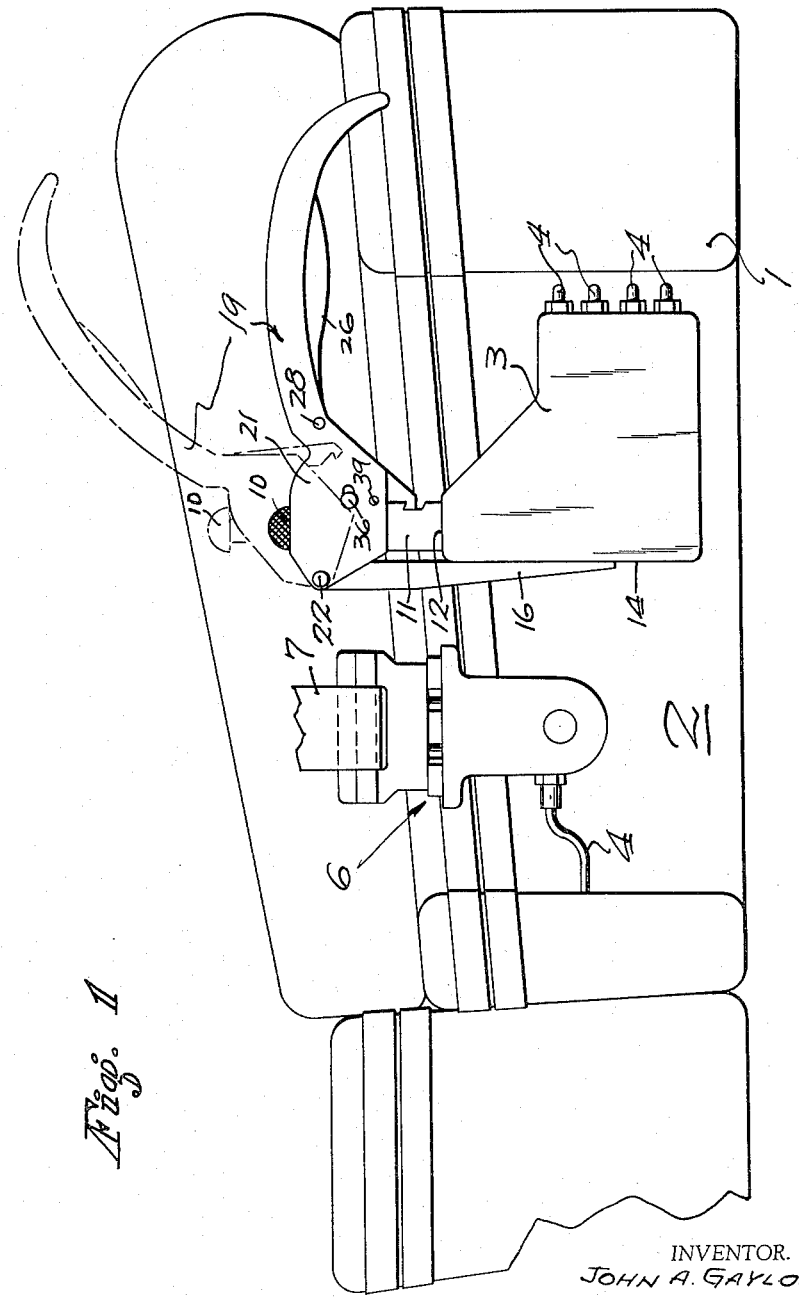

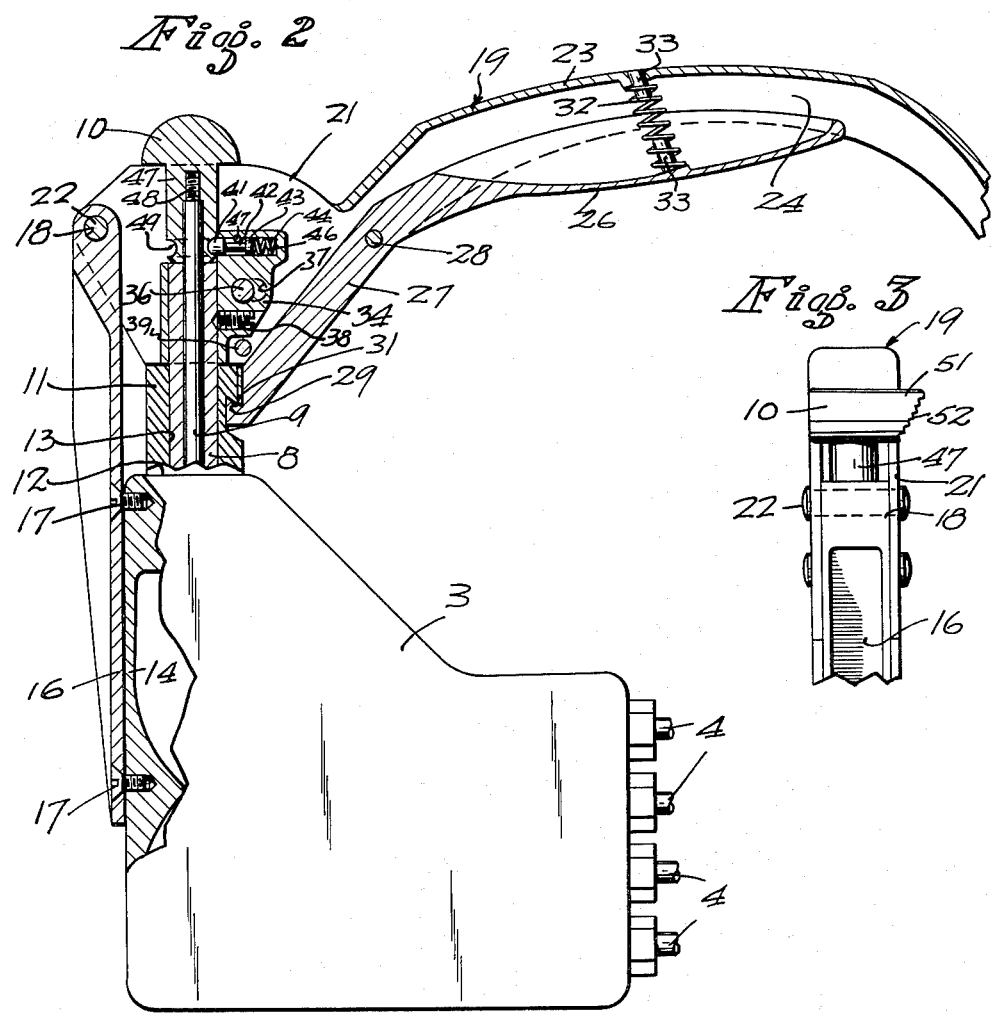

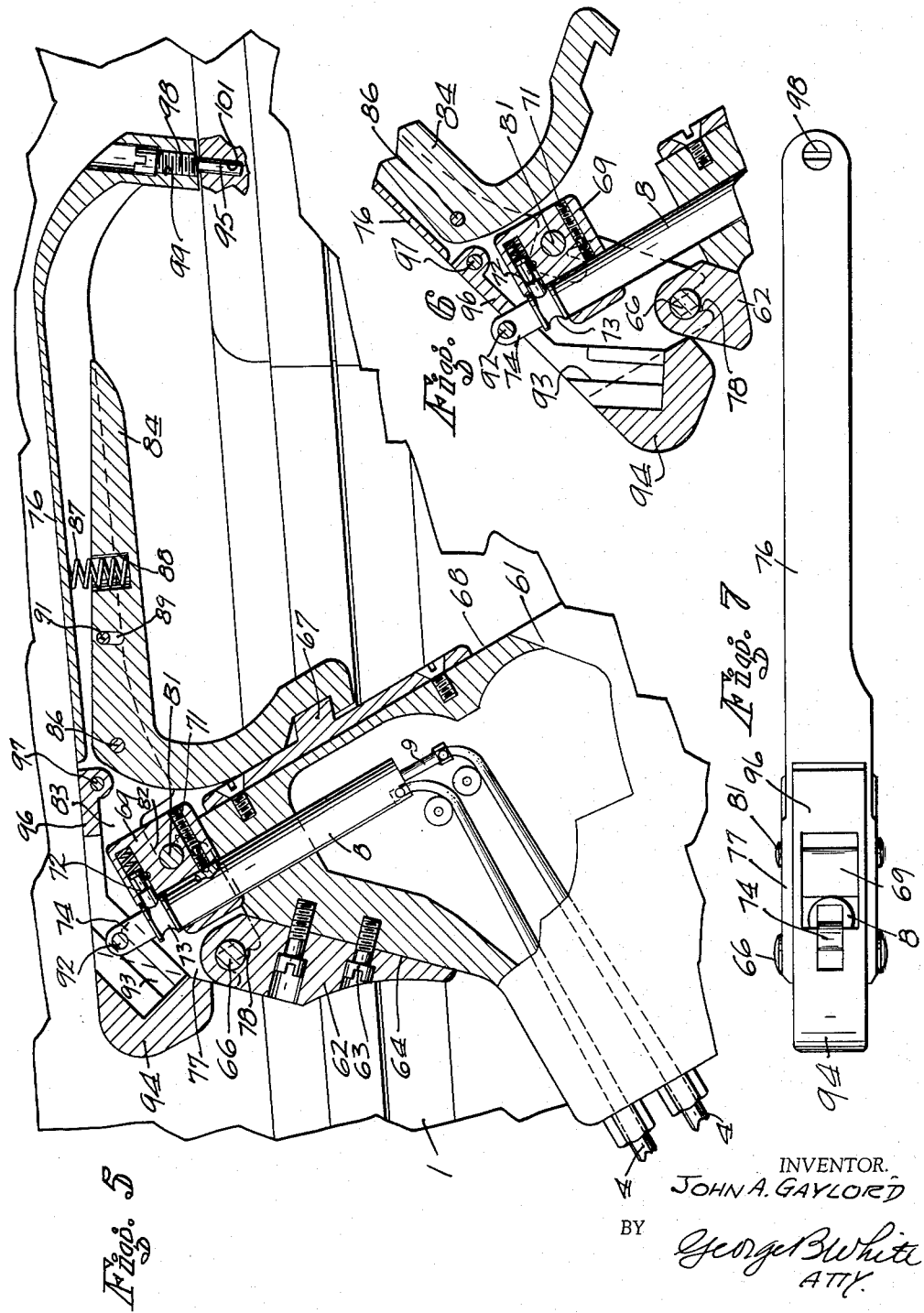

2,992,567
RELEASE HANDLE AND MECHANISM FOR SURVIVAL KITS FOR AIRCRAFT PERSONNEL
John A. Gaylord, San Rafael, Calif., assignor to H. Koch & Sons, Corte Madera, Calif., a partnership
Filed July 8, 1957, Ser. No. 670,563
9 Claims. (Cl. 74—479)

This invention relates to a release handle and mechanism for survival kits for aircraft personnel.

In escape from airplanes when the person is released or jumps from the airplane, there is tied to his person or to his parachute a box or casing for a survival kit which contains certain necessary devices and aid for survival upon landing. In such kit usually there is provided a folded inflatable raft connected to a container of compressed gas with controls actuated upon release to inflate the raft during the descent of the person. Usually there is also a built in oxygen container or tank with a valve connection to the mouth piece of the breathing mask of the person. The purpose of the releasing mechanism for such survival kits is to release and actuate the various devices at will or only after the person descended to a comparatively safe altitude. The facility of releasing the survival kit during such descent is very vital for the survival of a person. The various devices provided in the past either operated erratically or were difficult and awkward to manipulate, or had no easy access for manipulation.

The primary object of my invention is to provide a handle and releasing mechanism for a survival kit which could be positively yet selectively operated with ease and facility, and the handle of which provides positive locking, yet sufficient leverage to permit the operation of the release mechanisms quickly and without the exertion of undue force or fumbling.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a fragmental view of the outline of an aerial survival kit showing the general location of the release mechanism and the handle and release device in position in accordance with my invention.

FIG. 2 is a partially sectional and fragmental view of my handle and release device on such kit.

FIG. 3 is a fragmental end view of my handle and release device.

FIG. 4 is a top plane view of the handle and the release device.

FIG. 5 is a partly sectional view of a modified form of the handle and the releasing mechanisms connected thereto.

FIG. 6 is a fragmental sectional view of the detachable end of the handle, and

FIG. 7 is a top plan view of the handle.

The survival kit 1, as shown in FIG. 1, is a rigid unit with a recess 2 on one side thereof into which fits a rigid housing 3 containing the various usual releasing mechanisms not shown in detail, but which mechanisms operate through a set of flexible lines 4 leading to the various devices of the kit to be operated in the proper sequence in response to the manipulation of said lines.

Among the devices to be released is a suitable latch mechanism 6 which is released by the use of one of the flexible lines 4 on each side of the kit. A strap 7 on said latch mechanism 6 hangs on the harness of the parachute of the person using the kit so that the kit is suspended beneath the seat of the pilot until such time that the latch mechanism 6 is released through the cable 4.

The details of the releasing mechanism are not herein shown because they may be various conventional mechanisms. In the herein illustration a tubular rod 8 operates all the cables 4. Through the tubular rod 8 extends a bar 9 with a separate head 10 thereon so that when the bar 9 is pulled separately and independently of the tubular rod 8, then through suitable connection to the flexible lines 4 only unlatches the latch mechanism 6 so as to release the kit from the parachute strap 7. This separate operation is utilized only when the person is not in need of the raft or other such devices which otherwise would be operated by the pulling of the tubular rod 8. When it is necessary to set in operation the inflation of the raft, then the tubular rod 8 must be also pulled up so that all the flexible lines 4 are pulled simultaneously to set into action all the operations necessary for the particular situation for survival.

In order to accomplish this selective pulling up of the tubular rod 8 and the sliding bar 9 therein, in the herein invention a guide block 11 is provided on the top 12 of the housing 3. A passage 13 through the guide block positively guides the tubular rod 8.

On one side 14 of the housing 3 is a bracket 16 held on by suitable screws 17. The bracket 16 extends above the top 12 of the housing 3 and in its upper end has a bearing hole 18. A handle 19 has a hub 21 which is forked or formed with two parallel sides straddling the top of the bracket 16 and is pivoted thereon by a suitable pivot pin 22 extended through the bearing hole 18.

From the forked hub 21 extends a curved and dished grip handle 23. The longitudinal curvature of the handle 23 is upward or away from the housing 3 and the dished side of the handle faces generally toward the housing 3. In other words, as the kit is mounted the grip handle 23 is curved longitudinally so as to fit in the palm of the person using it and the dishing is on the underside forming a cavity 24 under the fingers of the user.

In the cavity 24 of the dished side of the grip handle 23 is a hollow handle 26 of a bell crank 27 pivoted on a pivot 28 on the base of the hub 21. On the end of the bell crank 27 adjacent the post 11 is provided an upwardly open hook 29 which fits into a keeper groove 31 in the side of the post 11. A coil spring 32 between the handle 26 and the underside of the grip handle 19 normally presses the handle 26 downwardly and the other end of the bell crank 27 upwardly so that the hook 29 is kept in firm engagement with the keeper groove 31. The coil spring 32 is guided on pins 33 extended respectively to a short distance from the grip handle 19 and the handle 26 opposite to one another, so that as the operator squeezes his fingers and palm together in engagement with the handle 26 and grip handle 19 respectively, the handle 26 is caused to move upwardly so as to disengage the bell crank hook 29 from the groove 31 and thereby permit the pulling of the entire handle device upwardly. At other times, the hook 29 and the groove 31 effectively hold the handle locked against any accidental disengagement or release.

In the middle of the hub 21 between its two branches or fork is provided a block 34 which is held securely by a cross pin 36 which extends through an elongated hole 37 in the sides 21 of the grip handle. The elongation of the hole 37 permits relative play due to the pivotal movement of the handle about its pivot 18. The block 34 is fastened to the tubular rod 8 by suitable set screw 38. A brace pin 39 is secured between the branches or fork 21 of the forked hub to reinforce the same.

In the top of the block 34 is provided a semi-spherical catch 41 which has a stem 42 thereon with a head 43 in its inner end moving in a recess 44. A spring 46 at the bottom of the recess normally presses this catch 41 outwardly out of the recess. An insert cross-pin 47 limits the outward movement of the head 43.

The head 10 has a shank 47 thereon, which is suitably screwed on the threaded end 48 of the bar 9. The shank 47 has a circular keeper groove 49 into which the semi-spherical catch 41 projects. In this manner whenever the grip handle is moved, the entire tubular rod 8 as well as the bar 9 therein and the head 10 therewith are moved together.

The head 10 is semi-spherical in cross-section and is suitably corrugated but it is extended beyond one side of the hub 21 and this extension 51 has a corrugated inclined underface 52 to facilitate engagement from the outside when the pilot or person desires to release by the rod 9 alone, namely only to actuate the release of the latch mechanisms 6 to detach the kit from the parachute strap.

In operation it is to be understood that the kit 2 has a lanyard folded on its top and connected to the parachute or flight personnel in such a manner that it limits the dropping of the kit 2 to a predetermined distance after its detachment or release.

If the person wants the kit in operative position but does not want to actuate or inflate the raft or actuate other automatic devices in the kit, then by placing a finger under the inclined face 52 of the head or button 10 it is pulled up. Sufficient pull must be exerted to cause the groove 49 to push the semi-spherical button catch 41 into its recess and to disengage the shank 47 from it and thereby to pull up the rod 9, which latter through the respective flexible lines 4 releases the latch mechanism 6 so that the kit can drop down and away from the parachute securing strap 7 as far as the lanyard, not shown, permits, and the kit hangs in that position upon landing. If the escape occurs over water, then the person grips the handle and squeezes the handle 33 against the underside of the grip handle 19 so as to release the hook 29 from its keeper 31 and then exerting by its leverage a further pull, turns the grip handle 19 about its pivot 18 and thereby pulls the block 46 upwardly and with it pulls the tubular rod 18 and the bar 9 together so as to operate all the flexible lines 4, simultaneously releasing the kit and automatically starting the inflation of the raft and all other devices that are to be started automatically by said flexible lines inside the kit.

A modified embodiment of this invention is shown in FIGS. 5, 6 and 7. In this modified form the rigid housing 61 is secured in position in such a manner that it is inclined upwardly and rearwardly of the handle. In this position the bar 9 and the tubular rod 8 extend at an angle with respect to the horizontal lid of the kit and at an acute angle toward the latch mechanism 6. In other words, the tubular rod 8 and the bar 9 work on an inclined axis rearwardly of the operator of the handle. The bracket 62 in this instance is secured by screws 63 to the slanting top side 64 of the housing 61 and has a pivot pin 66 extended through its top. The ends of the pivot pin 66 extend beyond the sides of the bracket 62. The keeper or catch 67 for the handle is in this instance on the front side 68 of the housing 61. The pulling block 69 in this form is secured and held by a set screw 71 on the tubular rod 8. A spring pressed catch 72 engages the groove 73 under a top ear 74 of the bar 9.

The main difference between this modified form and the first embodiment is that the handle 76 is entirely detached and released after it has performed its operation and that the separate release for the bar 9 has better leverage for manipulation.

The downward dished handle 76 has a forked bearing end 77, the bearing recesses 78 in the lower portions of the forked end of which are open at one side. As the handle 76 is pulled upwardly, it bears on the pin 66 but after this operation is completed sufficiently far the recesses 78 pull off the pin 66.

The pivot pin 81 through the block 69 also extends beyond the opposite sides of the block and is engaged by bayonet slots 82 in the opposite walls 83 of the dished handle 76 in order to provide for the necessary play and also to permit the ultimate disengagement of the handle.

The grip handle 84 is pivoted on a transverse pin 86 in the dished handle 76 and is pressed away from the handle by coil spring 87 in a pocket 88 in said grip handle 84. To limit the movement of the grip handle 84 an elongated slot 89 thereon rides on a limit pin 91 transverse in the dished handle 76.

In order to have better leverage for the separate operation of the bar 9 a pivot pin 92 extends through the ear 74 of said bar 9 and beyond the opposite sides thereof and it is engaged by grooves 93 in the head 94 of a lever 96 which lever 96 is pivoted at its forward end on a pivot pin 97 transverse to the handle 76. As the head 94 is pulled upwardly, the grooves 93 engaging the opposite ends of the pin 92 will pull the bar 9 up separately with good leverage. When the handle 76 is pulled up, however, the pivot pin 92 is released from the grooves 93, as shown in FIG. 6. For this purpose the inner ends of the grooves 93 are open.

For accurate location and to prevent accidental disengagement, a locating pin 95 is held by screw top 98 in a hole 99 in the free end of the handle 76 and is inserted into a locating hole 101 in the top of the kit. When the operator wishes to release this handle, he grips the handle and pulls the grip handle 84 toward the handle 76 thereby to disengage the grip handle from the keeper 67 as heretofore described. Then by further pulling the handle bearing the pivot 81, the block 69 and the tubular rod 8 are pulled upwardly therewith for the suitable release, and after the pull is completed, then the entire handle liberates itself from the pin 66 and through the bayonet slot from the pin 81 and is completely detached.

If it is only desired to move the rod 9 for releasing the kit only in the manner heretofore described, then the rear portion of the head 94 is easily engaged and swung around its pivot 69 thereby pulling the bar 9. The slots 93 allow for the arcuate movements relatively to the pin 92 during the pull.

The convenience and facility of operation and selectivity of release and location and leverage of the handles is of great importance to saving lives. This device permits such an ease of grip in operation and convenience in manipulation as to render it far superior to devices heretofore available for such grips and release.

I claim:

1. A manipulating device for operating actuating lines of an aerial survival kit, comprising a casing secured to said kit, a line pulling element movably held on the casing, a second line pulling element on the casing, means to interengage the second line pulling element with the first line pulling element for selective manipulation independently of or together with said first line pulling element, a handle, fulcrum means for pivoting said handle on said casing, a grip handle pivoted on said handle, coacting elements on said grip handle and on said casing for locking said grip handle and handle to the casing and being disengageable by turning said grip toward said handle, resilient means to urge said grip handle away from said handle and into locking position, and means of connection between said handle and said first pulling element for actuating said first pulling element by turning said handle about its fulcrum.

2. The manipulating device defined in claim 1, and said first line pulling element being tubular and said second line pulling element being slidably telescoped through said tubular first pulling element, and said interengaging means including a manipulating member on the outer end of said second line pulling element normally bearing against said first line pulling element.

3. The manipulating device defined in claim 1, and said fulcrum means including a pivot fixed on the casing, a heel on said handle having an open slot therein bearing on said fixed pivot as a fulcrum, a connecting element projecting from said first line pulling element, and said handle having a curved slot therein interlocking with said connecting element for pulling said first line pulling element when said handle is raised and disengaging from said connecting element after said handle is turned beyond a predetermined angle thereby to release said handle from said casing and from said pulling elements.

4. A manipulating device as defined in claim 1, a locating member in the free end of said handle releasably engageable with said kit.

5. A manipulating device as defined in claim 1, said coacting locking elements including a hook at the end of said grip handle nearest to said casing, and a keeper element on said casing engageable by said hook in locking position.

6. A manipulating device as defined in claim 1, said handle being elongated and extending away from said casing along said kit.

7. A manipulating device as defined in claim 1, said handle being elongated from its said connection with said first pulling element away from said casing and along said kit, and being extended oppositely from said elongation to the opposite side of its said connection and forming a bearing heel, a pivot extended from said casing forming part of said fulcrum means, and an open slot in said heel bearing against said pivot.

8. A manipulating device as defined in claim 1, and a lever arm pivotally movable relatively to said casing and to said handle in one direction only for operating said second line pulling element independently of said first line pulling element and of said handle, said lever arm overlying the top of said first line pulling element and the adjacent portion of said handle to be engaged and lifted thereby when said first line pulling element is actuated by said handle.

9. A manipulating device as defined in claim 1, said handle fulcrum means including a bearing in said handle open on one side and a pivot pin fixedly supported on said casing so that when said handle is in its fully lifted position the said bearing opening slides off said pivot pin for detaching said handle, and said means of connection between said handle and said first pulling element including a bayonet slot in said handle between said fulcrum means and the free end of said handle, and a pin extended from said first pulling element into said bayonet slot, said bayonet slot being open at one end thereof so as to slide off said last mentioned pin after the handle has been fully turned for pulling said first pulling element, and said handle being elongated beyond said bayonet slot away from said casing.

References Cited in the file of this patent
UNITED STATES PATENTS

| | | |
|---|---|---|
| 1,184,005 | Moe | May 23, 1916 |
| 2,114,301 | Harrigan | Apr. 19, 1938 |
| 2,467,038 | Kajdan | Apr. 12, 1949 |
| 2,655,329 | Martin | Oct. 13, 1953 |
| 2,671,623 | Toulmin | Mar. 9, 1954 |